J. L. CHAPMAN.
Corn Harvester.
No. 23,076. Patented March 1, 1859.
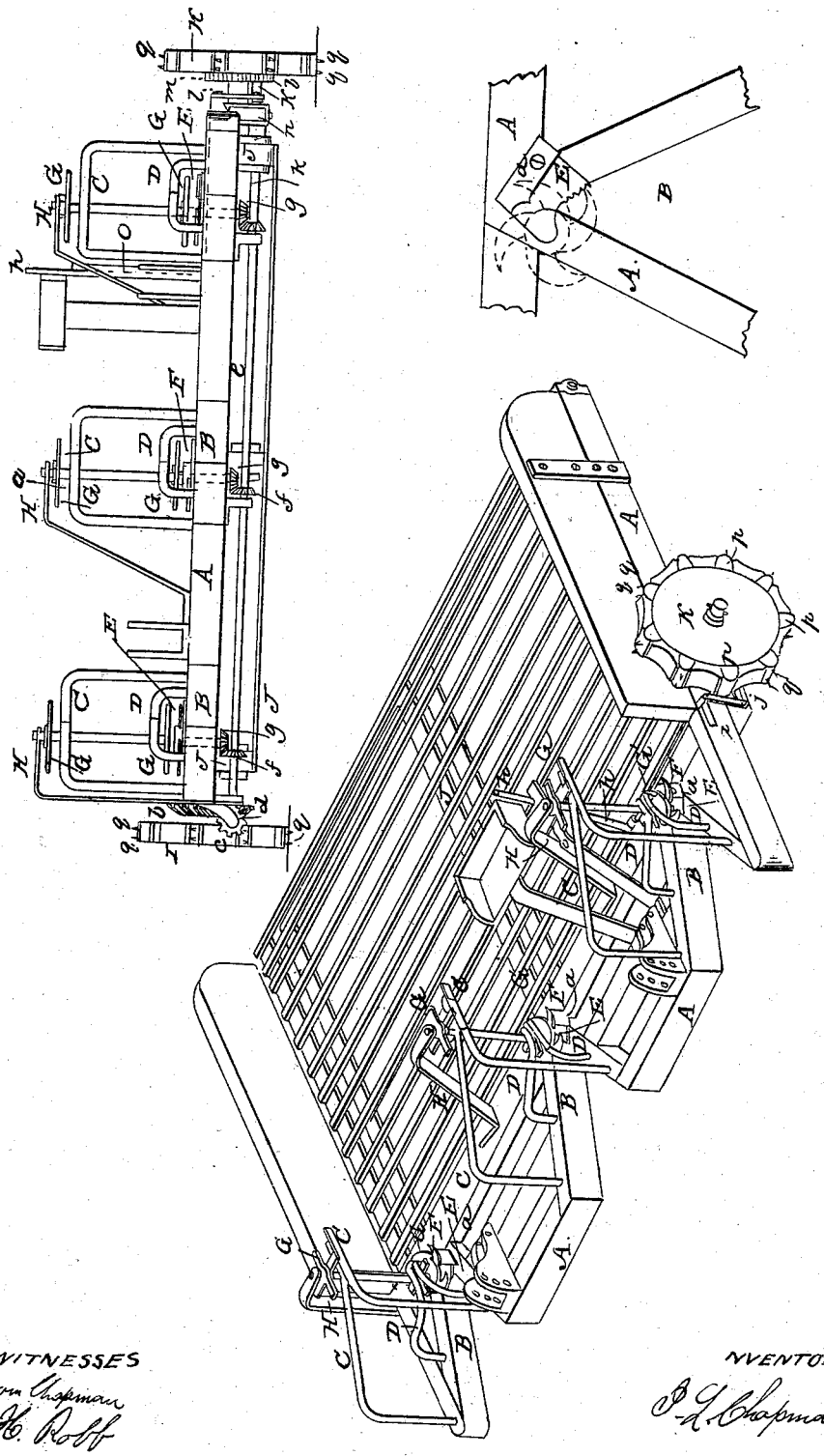
WITNESSES
INVENTOR

UNITED STATES PATENT OFFICE.

J. L. CHAPMAN, OF KINMUNDY, ILLINOIS.

IMPROVEMENT IN CORN-HARVESTERS.

Specification forming part of Letters Patent No. 23,076, dated March 1, 1859.

*To all whom it may concern:*

Be it known that I, J. L. CHAPMAN, of Kinmundy, in the county of Marion and State of Illinois, have invented certain new and useful Improvements in Corn-Harvesters; and I do hereby declare that the following is a full, clear, and exact description of the same, reference being had to the accompanying drawings, forming a part of this specification, in which—

Figure 1 is a perspective view of my corn-harvester; Fig. 2, a front elevation of the same, and Fig. 3 a detached view of one of my partially serrated and partially plain edged stationary cutters.

Similar letters of reference in each of the several figures indicate corresponding parts.

The nature of my invention consists, first, in the combination, with a corn-harvester frame having V-shaped conductors, of sickle-shaped revolving cutters, partially serrated and partially plain edged stationary cutters, upper and lower horizontal spring-guides, and endless apron, in the manner and for the purpose hereinafter described; second, in the partially serrated and partially plain edged stationary cutters, in the manner and for the purpose hereinafted described.

To enable others skilled in the art to make and use my invention, I will proceed to describe its construction and operation.

A is the frame of the machine, provided with V-shaped conductors B, which serve to conduct the fallen corn (or such stalks as may have grown or been planted crookedly) within the action of the cutters.

C C and D D are the upper and lower horizontal guides. These guides are each set at the same angle with the V-shaped conductors B, and one of their angles is made flexible to admit of the discharge of the corn onto the endless apron when acted on by the revolving reels G G'. The guides C and D, with the conductors B B B, serve to assist in bringing the cornstalks within the action of the reels and cutters, and hold the same in a proper condition for being operated upon by the cutters, and until discharged onto the endless apron by the upper and lower revolving reels, G G'.

E are the partially serrated and partially plain edged stationary cutters secured to the frame A. The serrated portions of these cutters are at the same angle as the V-shaped conductors B, and serve to break the outside hard portion of the stalks before the corn is brought within the action of the plain portion of the same, thereby greatly reducing the strain on the knives and lessening the amount of power which is usually required in cutting the stalk at one operation by simply a plain-edged cutter.

F are the sickle-shaped revolving cutters. These, as the machine advances, enter the openings in the stalks made by the serrated portion of the stationary cutters E, and on reaching the plain-edged portion of the same act in concert or simultaneously therewith, and cut the stalks with comparative ease and facility, owing to the stalks having been operated upon by the serrated edge of the stationary cutters. The upper and lower revolving wheels, G G', are secured to the shaft of the sickle-shaped revolving cutters in such a position as to discharge the corn, after it is cut, onto the endless apron.

H are standards for the upper bearings of the revolving cutter-shafts. These shafts have their lower bearings on the frame A.

*a a a* are metal pieces extending across the frame at the back of the partially serrated and partially plain edged cutters E, and act as braces to strengthen and retain the cutters E in their proper position on the frame.

*b* is a cog-wheel secured to the driving-wheel I and gearing into a pinion secured to the shaft of the pinion *c*. The pinion *c* gears into the pinion *d*, secured to the shaft *e*.

*f* are pinions attached to the shaft *e*, and gear into pinions *g* on the lower ends of the shafts of the sickle-shaped revolving cutters. By this arrangement of gearing, as the machine is propelled, motion is given to the revolving cutters and reels.

J is an endless apron, which serves to retain the corn until the driver is ready to discharge it.

*h* is an adjusting-lever, having its bearings in pieces secured to the back of the frame A, and provided with a crank, *i*, which is jointed at *j*, and extends around the shaft *k*, which operates the endless apron J.

O is a notched set-bar for holding the lever when the adjustment has been effected. On the end of the shaft of the endless apron is secured a small pinion, *l*, which gears into a cog-wheel, *m*, secured to the driving-wheel K. The shaft *k* is arranged to be moved back or forward in a slot of the metal piece *n* by the lever *h*. By moving the lever *h* forward and securing it in a notch on the set-bar O the crank $i$ causes the crank $k$ to move in the slot in the metal piece $n$, and throws the pinion $l$ in gear with the cog-wheel $m$, thus imparting a rapid motion to the endless apron J.

The driving-wheels I K of the machine are cast with dovetailed openings in their periphery, and provided with corresponding pieces, $p$, fitting securely therein, and having spurs $q\ q$ projecting from their outer side. All driving-wheels with which I am familar are subject to wear and often breakage of the spurs on their periphery, thereby rendering the wheel an imperfect one. By this feature of my invention the driver is enabled to take out the dovetailed piece or pieces having their spurs broken and replace them by new ones with ease and facility, and thereby a great saving of the time usually lost and expense incurred in sending the machine to the shop is effected.

What I claim as my invention, and desire to secure by Letters Patent, is—

1. The combination, with a corn-harvester frame having V-shaped conductors B, of sickle-shaped revolving cutters F, partially serrated and partially plain edged stationary cutters E, upper and lower horizontal spring-guides, C C and D D, and endless apron J, all arranged and operating substantially as and for the purpose set forth.

2. The partially serrated and partially plain edged stationary cutters E, of the form described and shown, in combination with the rotary cutters F, substantially as and for the purposes set forth.

The above specification of my improvement in corn-harvesters signed by me this 30th day of November, 1858.

J. L. CHAPMAN.

Witnesses:
  HIRAM CHAPMAN,
  J. H. ROBB.